April 28, 1953        C. K. COLE        2,636,332

LAWN MOWER ROLLER SUPPORT

Filed April 10, 1951        2 SHEETS—SHEET 2

INVENTOR.
CLAYTON K. COLE
BY
Kenyon & Kenyon
HIS ATTORNEYS

Patented Apr. 28, 1953

2,636,332

UNITED STATES PATENT OFFICE 2,636,332

LAWN MOWER ROLLER SUPPORT

Clayton K. Cole, Kalamazoo, Mich., assignor to Atlas Press Company, Kalamazoo, Mich., a corporation of Michigan Application April 10, 1951, Serial No. 220,280

3 Claims. (Cl. 36—249)

This invention relates to lawn mower constructions and particularly to the means for mounting the lawn mower roller on which the lawn mower is supported in operation so that it may be easily adjusted to control the height of the cut.

Figure 1:
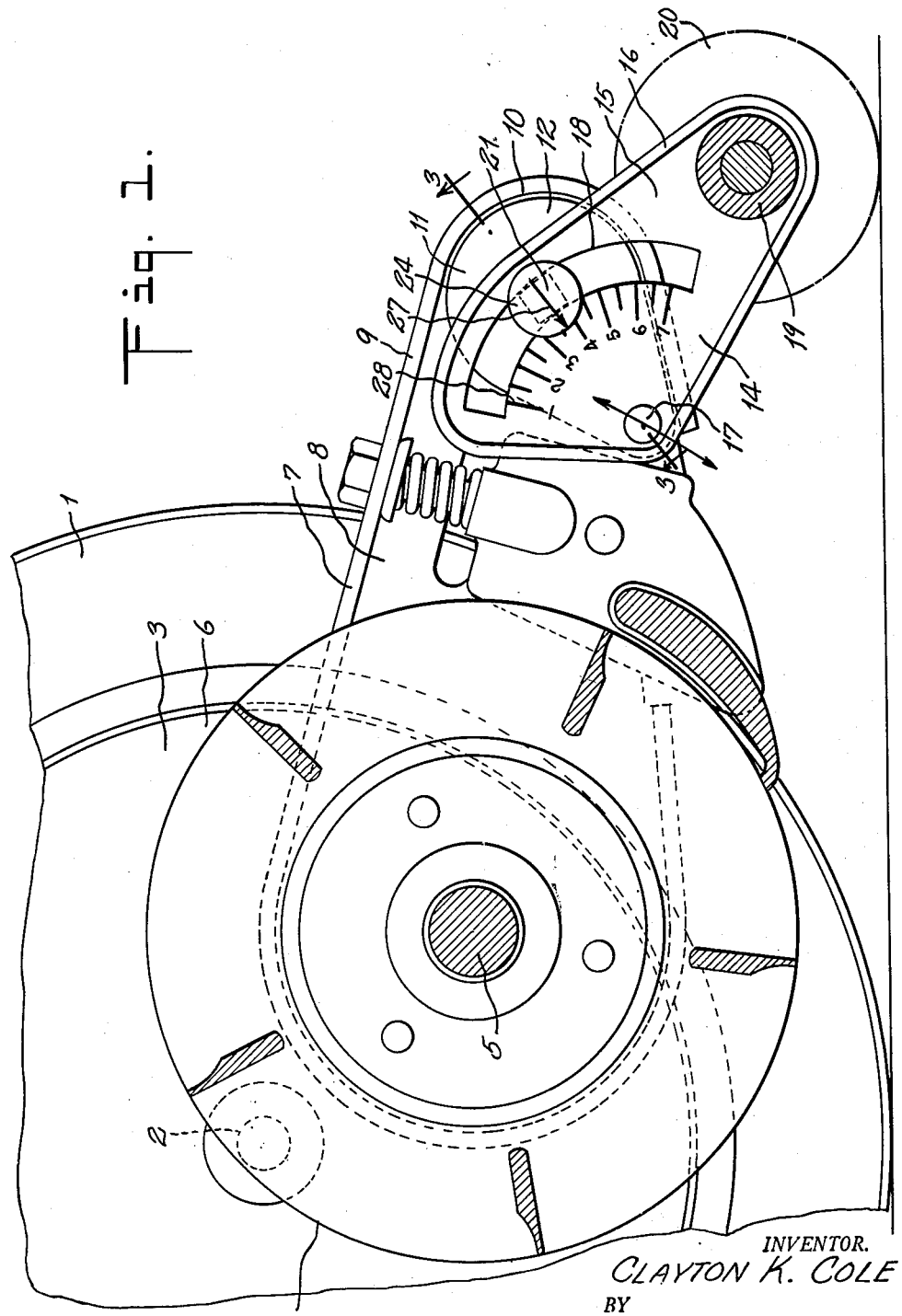
Figure 2:
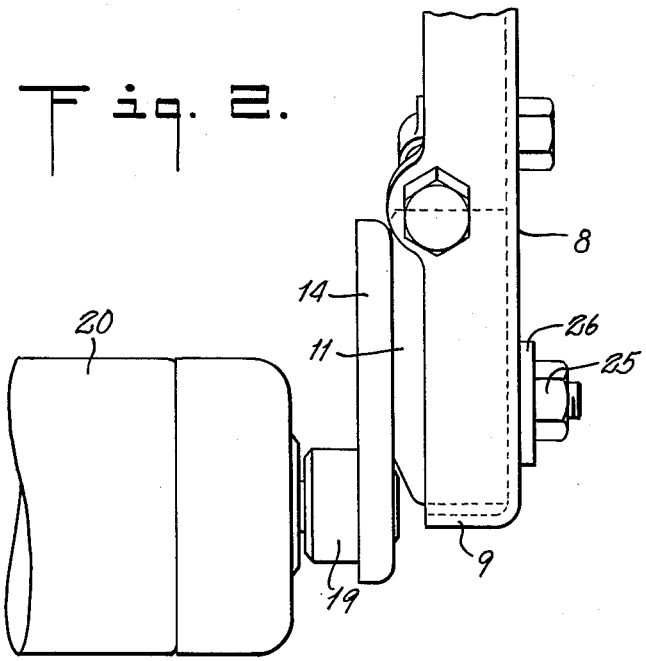
Figure 3:
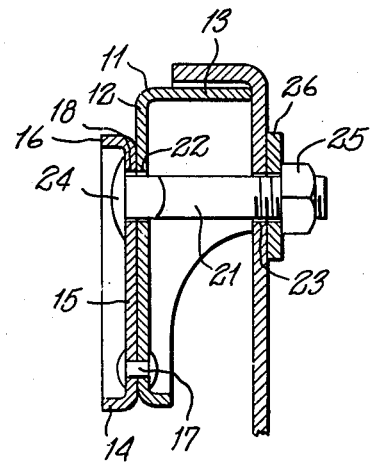

One of the objects of the invention is to provide such a construction which may be made inexpensively and which may be installed on or removed from the mower with a minimum of effort and which may be easily adjusted. Another object of the invention is to provide such a construction which can be made of sheet metal stampings. Further objects and advantages of the invention will be apparent from the following description of a preferred form of the invention which is shown in the accompanying drawings, in which Fig. 1 is a side elevation of a portion of a lawn mower showing the invention installed thereon;

Fig. 2 is a top plan view of one end of the adjusting and mounting mechanism shown in Fig. 1, and Fig. 3 is a detailed, sectional view taken on the line 3—3 of Fig. 1.

The invention consists generally in providing a lawn mower construction of the type above referred to in which a sheet metal end frame member is provided. This member is provided with an inwardly-extending flange which forms a seat for the roller adjusting and mounting mechanism. The roller adjusting and mounting mechanism consists of 2 dished sheet metal members. One of these members is formed to fit against the end frame member and the other is provided with a bearing to support the roller. These dished members are placed back-to-back, that is, with their convex sides together. They are pivotally joined by a through rivet which serves as a pivot so that they may be pivoted in the plane of their contiguity. The member which carries the bearing for the roller is provided with a slot which extends along the circumference of a circle which has its center at the rivet which serves as the pivot. A bolt extends through this slot through the member which is seated against the frame member and through the frame member. This bolt serves both to clamp the supporting mechanism on the frame member and as means for clamping the members in adjusted position. When this bolt is slightly loosened, the member which carries the bearing for the roller may be swung about the pivot to adjusted position. The bolt serves in such circumstances to hold the parts substantially in position and the meeting faces of the members supply sufficient friction so that the parts are held substantially in adjusted position but can be moved. This facilitates the adjustment since by merely loosening the bolt a small amount it is possible to slide the parts to the desired position. When they are thus positioned, the bolt is tightened so that the parts are anchored in place.

The preferred form of the invention is shown in the drawings. The lawn mower has the conventional wheel 1 which has the axle 2 on which the frame member, indicated generally at 3, is suspended. A cutter reel, indicated generally at 4, is pivotally mounted on a shaft 5 in the end frame member. The end frame consists of a member 6 and a sheet metal member 7 which has a flat central portion 8 and an inwardly-extending flange 9. The flange 9 at the rear end of the frame forms a seat 10 which receives and positions the roller-carrying mechanism. The roller-carrying mechanism consists of a dished sheet metal member 11 which has a substantially planar bottom 12 and a flange 13. This member, and particularly its flange, is formed to fit within a seat 10 formed by the flange 9 on the end frame member 7. A second dished sheet metal member 14 is also provided. It has a substantially planar bottom 15 and a flange 16 which serves as a strengthening rib and also serves to partially conceal the adjusting mechanism. The members 11 and 14 are disposed back-to-back and are pivotally connected by a rivet 17. The member 14 has a slot 18 therein which extends along the circumference of a circle which has the rivet 17 as its center. It also carries a bearing 19 for the roller 20. This bearing is spaced from the pivot so that movement of the member 14 about the pivot 17 will adjust the height of the mower frame from the ground. A bolt 21 extends through the slot 18, a hole 22 in the member 11 and a hole 23 in the frame member 7. The bolt head 24 engages the member 14 and the nut 25 engages the outer face of the member 7 through a washer 26.

The bolt 21 serves not only to hold the members 11 and 14 on the frame member 7, but serves also as the adjusting mechanism and the mechanism for holding the parts in adjusted relationship.

A suitable indicating mark 27 is provided on the head of the bolt and a suitable scale 28 is provided adjacent the slot 18.

In operation of the device the nut 25 is loosened sufficiently to permit pivotal movement of the member 14 about the pivot 17. The nut 25 is preferably loosened just enough so that the parts are maintained in relative position from frictional relationship such that they will stay in adjusted position but will be movable by application of force such as one adjusting the mower can supply by hand. When the parts have been moved to the adjusted position the nut 25 is clamped and the parts stay in adjusted position.

The preferred form of the invention has been described above. There is no intention by describing merely the preferred form of the invention to confine the invention to this particular form, since other forms could be employed with many of the advantages attendant upon the preferred form.

I claim:

1. In a lawn mower construction a sheet metal side frame member having an inwardly-extending peripheral flange defining a seat for locating a roller support and a roller support comprising a first dished sheet metal member shaped to conform to said seat and disposed thereon with its concave side toward said side frame member and an adjustable member comprising a second dished sheet metal member disposed with its convex side against the convex side of said first member and pivoted thereto on a pivot perpendicular to said side frame member and having a slot extending along the circumference of a circle having its center at said pivot and also carrying a bearing for a lawn mower roller spaced from said pivot and a bolt extending through said side frame member, said first member and said slot in clamping relationship whereby the lawn mower roller may be adjusted by loosening said bolt and pivoting said second member to desired position and whereby said members may be clamped in adjusted position.

2. In a lawn mower construction a side frame member having a seat for locating a roller support and a roller support comprising a first member shaped to conform to said seat and disposed thereon and an adjustable member disposed against said first member and pivoted thereto on a pivot perpendicular to said side frame member and having a slot extending along the circumference of a circle having its center at said pivot and also carrying a bearing for a lawn mower roller spaced from said pivot and a bolt extending through said side frame member, said first member and said slot in clamping relationship whereby the lawn mower roller may be adjusted by loosening said bolt and pivoting said second member to desired position and whereby said members may be clamped in adjusted position.

3. In a lawn mower construction having a side frame member a roller supporting and adjusting mechanism comprising a pair of sheet metal members each having a substantially planar central portion and a peripheral flange extending substantially perpendicular thereto, said members being disposed with their bottoms in contiguous relationship and joined by a through pivot to pivotal adjustment relative to one another in the plane of contiguity, one of said members being disposed with the free edge of its flange against the side member and the other having a slot extending along the circumference of a circle having its center at said pivot and carrying a bearing for a roller spaced from said pivot, and a bolt extending through said slot, said member adjacent said frame, and said frame to permit clamping of said members in adjusted position on said frame.

CLAYTON K. COLE.

References Cited in the file of this patent

UNITED STATES PATENTS

| Number | Name | Date |
| --- | --- | --- |
| 1,399,601 | Boll | Dec. 6, 1921 |
| 2,088,293 | Funk | July 27, 1937 |
| 2,250,418 | Funk | July 22, 1941 |
| 2,414,077 | Wells | Jan. 17, 1947 |